United States Patent Office 3,528,441
Patented Sept. 15, 1970

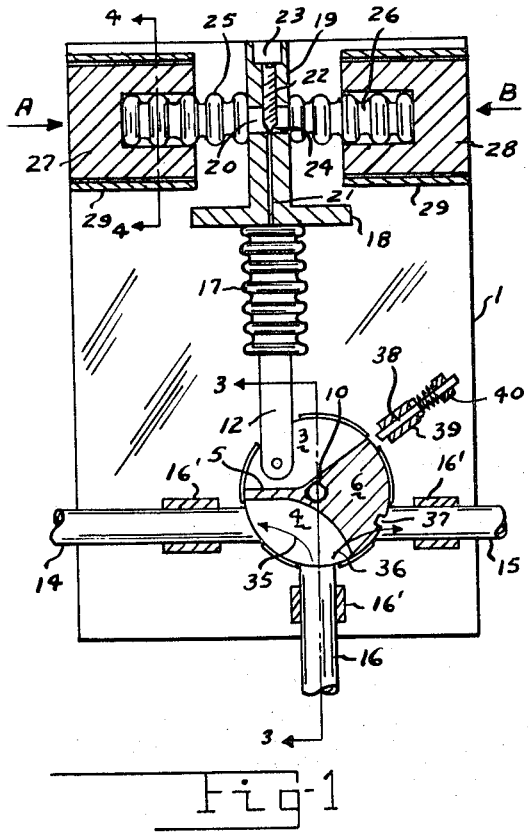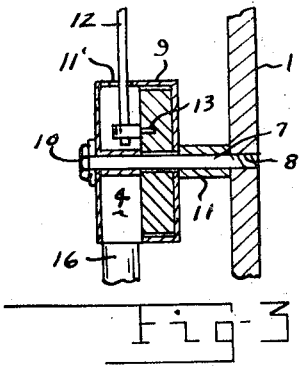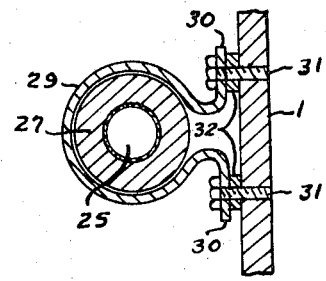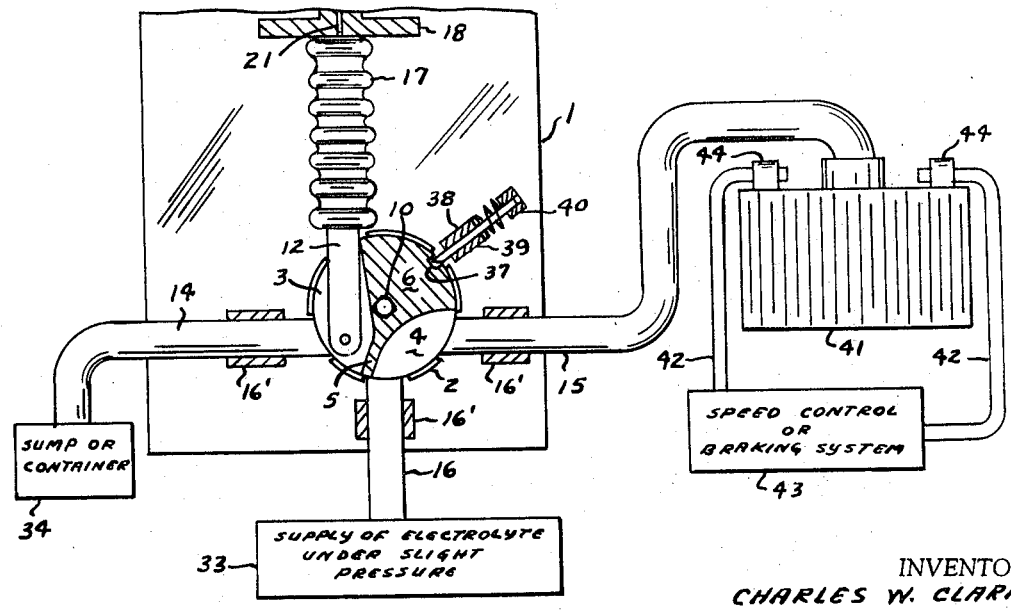
Fig-1
Fig-3
Fig-4
Fig-2
INVENTOR
CHARLES W. CLARK
BY Harry A. Herbert Jr. and Herbert H. Brown
ATTORNEYS

3,528,441
ACCELERATION ACTUATED VALVE
Charles W. Clark, Dumont, N.J., assignor to the United States of America as represented by the Secretary of the Air Force
Filed Apr. 3, 1968, Ser. No. 718,623
Int. Cl. F16k 17/36
U.S. Cl. 137—48                                            7 Claims

ABSTRACT OF THE DISCLOSURE

A valve is disclosed which operates on the force exerted by the acceleration of a fast moving body such as a missile, rocket or train. It employs two oppositely disposed bellows, arranged horizontally, to which heavy weights are attached and these weights respond to an increase in speed or acceleration. The contents of the bellows communicate through a metering passageway with a third bellows arranged vertically. All three bellows are filled with an incompressible fluid and an adjustable needle valve is provided in the passageway to control the rate of flow of the fluid into the third bellows.

A push rod is secured to the free end of the third bellows and this rod is pivotally secured to a circular plate. The latter has two milled out portions along its flat side, one portion receiving the pivot of the push rod and the other portion constituting a passageway across the face of the plate. The milled out portions are separated from one another by a narrow ledge at one side and a larger area at the opposite side which form the outer surface of the plate. The circular plate is rotatably mounted on a stationary shaft and is inclosed within a casing.

There are three conduits presented to the periphery of the plate through the openings in the casing, one constituting an "inlet" conduit carrying fluid under pressure, and the other two constituting "first" and "second" outlet conduits. The latter are arranged on opposite sides of the peripheral edge of the plate, and the inlet conduit is located midway between the other two. The inlet conduit and the "first" conduit are normally in communication through the lower milled out portion of the plate and the fluid is caused to flow into a sump or drain.

When one of the horizontal bellows is caused to contract on account of an increase in speed or accelerating force acting against its attached weight, the liquid in that bellows will be forced into the lower or vertical bellows and cause the push rod to turn the circular plate in such a way as to bring the "inlet" conduit in communication with the "second" conduit. Thus the fluid introduced into the inlet conduit, which normally would have passed through the milled out compartment in the plate into the "first" outlet conduit, is now caused to pass into the "second" conduit in order to actuate the necessary control devices which will respond to the change in speed or acceleration.

The same operation would apply if the other of the two horizontal bellows were caused to contract by a change in speed in the opposite direction and cause the fluid in the last mentioned bellows to flow through the same metering passageway into the third bellows to turn the circular plate in the same direction as before.

BACKGROUND OF THE INVENTION

The invention relates to acceleration actuated valves which have general utility in connection with the speed control of fast-moving bodies such as missiles, rockets, airplanes and trains. Many of these bodies usually start from a stationary position and gather speed quite rapidly, sometimes at an excessive rate which might cause accidents or perhaps damage to the body itself. In the past, various ways, including manual and electronic, have been employed to control the rate of acceleration, either in the "increase" or "decrease" directions. In the case of missiles and rockets, which require a sensitive control, not only at the start of flight but also in orbit, up to the present time, have been under the command of a ground station through a transmitted signal. However, such control could more properly be exercised and with greater accuracy automatically on the basis of the acceleration-time product, without being dependent on any control device that is external to the missile or rocket. Again, in the case of a high-speed train, it is sometimes necessary when the train is accelerating with a sudden burst of speed, either forward or backward to apply the emergency brakes. This would normally be attended to by the brakeman, but here again, it would be preferable and certainly far safer if the brake were set automatically by the effect of the excess in speed or in the product of acceleration and time.

In one aspect, my invention contemplates the use of a primary cell battery as the initiator of the necessary control of acceleration or speed, attached to the body to be controlled. A battery of this type can become effective only from the time that it is charged with electrolyte so that by determining when the electrolyte is to be made available to the battery in response to a change in speed or the rate of acceleration of the body, it then becomes possible to provide the necessary initiation of the improved form of control.

It is well known that batteries of the electrolytic type have two disadvantages, assuming the battery had been fully charged: (1) the battery may stay idle from blast-off of the missile or rocket until the time for initiating the acceleration control, and therefore, may undergo some loss in voltage. This could possibly entail failure of the control. The loss in voltage may be even more significant if the battery had been charged a considerable time before takeoff and (2) any device which is filled with a destructive acid for any long periods of time prior to being actually used, is always a source of danger to the personnel.

BRIEF SUMMARY OF THE INVENTION

An object of the invention is to provide apparatus which is sensitive to an excessive change in speed or the product of acceleration and elapsed time and which would exert, without fail, the desired speed control in bodies that travel at a fast rate in one direction and/or the reverse direction.

Another object is to provide a device which is responsive to the product of acceleration and time and which will supply electrolyte to a "dry charge" battery as long as the said product remains above a predetermined value.

Still another object is to provide a speed acceleration control for fast-moving vehicles and which employs an electrolytic battery to supply the energy and also to initiate the operation of the control device or mechanism.

A further object is to provide a control device of the type mentioned and in which the battery does not involve any deterioration in voltage, even when remaining idle over long periods of time.

A more specific object is to supply an electrolytic battery, forming part of the power complex of a rocket or other speeding body with electrolyte when the rocket exceeds a predetermined acceleration-time product but will withhold the electrolyte supply at speeds less than the predetermined product.

The above objects are carried out, in brief, by providing a bellows operated mechanism filled with liquid and in which at least one of the bellows is made responsive to the speed or the product of acceleration and time, and causing the response of the bellows to supply fluid to another bellows which, in turn, rotates a valve. This valve employs three ports, two of which allow a source of electrolyte to pass through the valve into a sump or drain and the third port which, when connected with one of the first-mentioned ports, causes the electrolyte to flow into a "dry charged" battery or batteries that immediately give off full voltage. The current from this battery, when so charged, will then operate a servomotor or other actuator for providing the initiation of jets or other operations, which controls the speed or acceleration of the moving vehicle.

The invention will be better understood when reference is made to the following description and the accompanying drawing, in which:

BRIEF DESCRIPTION OF THE DRAWINGS

FIG. 1 represents by diagram and in broad plan view the bellows actuator including the acceleration responsive devices together with the improved valve operated by the bellows system;

FIG. 2 is a view similar to the lower part of FIG. 1 but showing the change in the position of the ports controlled by the valve in response to a change in the product of acceleration and time of the moving body. This figure shows the charging of a so-called "dry charged" battery when the rotary valve has operated;

FIG. 3 is a fragmentary section taken along lines 3—3 of FIG. 1 and looking in the direction of the arrows; and FIG. 4 is a fragmentary section taken along lines 4—4 in FIG. 1.

DESCRIPTION OF THE PREFERRED EMBODIMENT

Referring to FIG. 1, reference character 1 designates a metal base on which the valve apparatus and the bellows actuator are mounted. The valve consists essentially of a round, flat plate 2 of aluminum or plastic material having portions 3, 4 which have been milled out to one-half the thickness of the plate. Each of the portions comprise an area of about one and one-half quadrants, leaving a narrow ledge 5 with parallel edges, and a wide solid segment 6, both having the same thickness as the plate. The latter is mounted for a swinging motion about a vertical shaft 7 (FIG. 3) rigidly fixed, as indicated by the threads 8 in the base member 1. The bore for receiving the shaft is located at the center of the plate 2, passing through the two unmilled portions 5, 6. There is a circular casing 9 surrounding the plate 2 (FIG. 3) in order that the milled portion 4 will in effect constitute a fluid-tight compartment. The casing is completely enclosed except for three circular openings which correspond to the positions of three conduits and a short arcuate slot at the top which will be described presently. The casing 9 remains stationary and is affixed to the shaft 7 by means of a washer and nut indicated at 10. A spacer tube 11 may be inserted between the casing and the base 1. However, the plate 2 is loosely mounted on the shaft and is permitted to rotate within the casing.

There is a push rod 12 extending through the arcuate slot 11' (FIG. 3) in the top of the casing 9 and is swivelly mounted, as indicated by the pin 13, on the milled-out portion 3 of the plate. Thus, as the plate swings through a limited angle as described hereinafter, the push rod 12 can remain in a substantially vertical position as it moves along the slot in the casing.

On each side of the circular plate valve member there are a pair of round conduits 14, 15 presented to the periphery of the plate and its surrounding casing, the purposes of which will be described hereinafter. In addition, there is a third conduit 16 presented in a direction as would pass vertically through the center of the plate and this third conduit will also be referred to hereinafter. Suitable openings are provided in the casing 9 at the position of each conduit 14, 15 and 16 so that the latter can practically touch the periphery of the plate 2. These conduits may be held in position above the base 1 by means of apertured stanchions 16'. The push rod 12 is secured to a bellows 17 which extends in the vertical direction (as shown) and is secured to a heavy metal disc 18 which forms part of a metal upright member 19. The latter preferably has four flat sides and is supported from the base in any suitable manner. The bellows 17 may be made of any non-corrodible metal such as stainless steel, and should have sufficient flexibility that when the lower end is subjected to fluid pressure, the bellows will readily elongate in order to press the push rod 12 downwardly. The member 19 has a horizontal opening 20 extending therethrough and there is a small metering passageway 21 which extends from the opening 20 through the member 19 and communicates with the interior of the bellows 17. Above the opening 20 there is a needle valve 22 which is screwed into the member 19 and is made accessible through a countersunk opening 23. This needle valve, shown as a rod of rigid size, is provided at the lower end with a conical tip 24 adapted to move toward the metering passageway 21. It is apparent that by screwing the needle valve 22 farther down, the passageway 21 can be controlled as to size. On the opposite sides of the upright member 19 there is a pair of bellows 25, 26 similar to bellows 17, and hermetically sealed as by solder (not shown) to said member. Both bellows 25, 26 are preferably made of stainless steel similar to bellow 17 and have a thickness such as to be readily compressed in a manner as will be described hereinafter. However, each bellows 25, 26 cannot be elongated beyond its "liquid full" position but can be moved into a state of contraction, i.e., toward the member 19 when pressure is exerted inwardly against the extreme ends. Toward the ends of each bellows, there is a pair of counterweights 27, 28 of metal lightly fitted around the bellows so as to move with the convolutions of the bellows and yet not interfere with the expansions of the individual convolutions. The exterior shape of these weights can be either circular or square and are provided at the center with countersunk openings for receiving the bellows. FIG. 4 shows one way in which the weights and the contained bellows can be supported from the base 1. A fairly wide strap of thin metal 29 envelops each of the weights but allows the latter to move freely within the strap. The latter is provided with winged portions 30 for receiving screw bolts 31 can be secured to the base. If desired, a spacer 32 may be employed between the wing portions of the strap and the top surface of the base.

In operation, assume that the bellows 25, 26 and 17 have been completely filled with an incompressible fluid, such as water, and the apparatus has been installed on a missile or rocket in such a way that at blastoff the accelerating force is exerted in the direction of the arrow A (FIG. 1). If the missile or rocket for any reason were to accelerate at a rate faster than a predetermined rate, depending on the parameters and the adjustments of the various parts including the position of the needle valve 22, the excess of acceleration will act on the weight 27, for example, and cause the latter to move inwardly and compress the left hand bellows 25 since the right end of the bellows is held rigidly in position against the member 19. The effect of this contraction would be to force liquid through the opening 20, past the needle valve 22, into the opening 21 and into the bellows 17. The needle valve is adjusted to allow any desired rate of flow from the bellows 25 to the bellows 17 and thus control the rate of turning of the plate valve 2. The additional liquid will cause the bellows 17 to expand downwardly to actuate the push rod 12. The latter will then cause the valve plate 2 to rotate counterclockwise. When the latter is turned, the compartment formed by the milled-out portion 4 moves from a position of straddling the conduits 14 and 16 to a new position in which the conduit 16 is brought into communication with the conduit 15. The arrangement is such that the change in the passageway position of the conduit 16 from the conduit 14 to the conduit 15 when a predetermined excess of acceleration has caused the bellows 25 to contract could readily be employed to obtain any form of control that may be desired in the operation of the missile or rocket navigation or the initiation of driving power, such as the separation of the various stages of the rocket. Thus, the control of these various operations would be effected, not by command from a ground station, but solely by the acceleration-time product and therefore by the position of the missile or rocket in space. In the case of railway equipment, the switch-over from conduit 14 to conduit 15, brought about by the movement of plate 2, could be used for setting the emergency brakes.

It will be understood that the actuating force to bring about these various controls may be liquid that is supplied from the reservoir 33 (FIG. 2) under the necessary pressure to bring about the required operation of the safety or other control device so that while the bellows 25 remains in an uncompressed position due to an acceleration force of less than a predetermined amount, the supply of the fluid under pressure would simply return to a sump container indicated at 34 along a path indicated by the arrow 35. However, after the plate 2 has swung to a position as to bring the conduit 15 into communication with the conduit 16, the liquid under pressure will now flow in a direction indicated by the arrow 36.

It may be necessary to maintain the position of the plate 2 in its last actuated position and for this reason the unmilled portion 6 of the plate may be provided with a square notch indicated at 37 which is adapted to receive a spring pressed latch 38 adapted to press automatically into the notch if the plate is moved to its last or full flow position. The spring latch 38 is slidably fitted in an upright lug 39 secured to the plate 1 and the spring may be positioned between the outer end of the latch and another lug 40, also anchored in he base. The spring is of the compression type as indicated and is continually urging the latch 38 toward the periphery of the plate 2. A small opening in the casing 9 may be provided to permit the latch 38 to be pressed into the notch when desired.

While I have shown that a valve of this character can be used broadly for many control purposes within a missile, rocket or on a speeding train, assuming that the reservoir 33 is supplied with a suitable liquid under adequate pressure and the path of the fluid is changed from the path indicated at 35 to the path 36, I have shown in FIG. 2 the manner in which this valve actuated control can be used in connection with the charging of a so-called "dry charged" battery. These batteries, as is well known, do not generate an electromotive force until they are filled with a suitable electrolyte. Consequently, the unfilled dry battery indicated at 41 may be placed in a device intended to travel from a standstill through subsonic to supersonic speeds, accelerating all the time. Until the rate of acceleration has exceeded a predetermined amount, the bellows 25 will not have contracted. However, since the product of acceleration and time represents a position in space, it may be desired that certain functions such as an explosion, initiation of a jet stream, or a change in direction should not take place until the above mentioned product has been exceeded. The battery 41 will not have been supplied with electrolyte and therefore could not originate any initiating impulse until the valve 2 will have been rotated to bring about the change in the conduit connections. In FIG. 2 cables 42 are shown diagrammatically as being connected between the battery and a rectangle 43 which may constitute a speed control mechanism or an explosion igniting mechanism or even a braking system.

It is apparent that the "dry charged" battery 41 could remain idle within the missile or rocket or in the train equipment for long periods of time without any deterioration of the electrodes or the generation of electromotive force. Consequently, it would have a life of indeterminate length but would be ready almost on an instant's notice to provide full voltage across the terminals 44 as soon as the electrolyte has been conveyed to it in the manner stated.

If by chance, and particularly in the case of railway equipment, the accelerating force would be in the opposite direction to that previously assumed and is now acting in the direction B (FIG. 1), the bellows 26 and its weight 28 would respond similarly to the bellows 25. The liquid from the bellows 26 would cause the bellows 17 to elongate as before and the plate 2 would swing about its pivot in the counterclockwise direction. In this case, the opening of the conduit 16 would be transferred from the conduit 14 to the opening in the conduit 15 as explained hereinbefore. The dry charged battery in such case when filled with electrolyte could operate through actuators to apply the emergency brake in order to slow down a speeding train, which may accidently be travelling in the reverse direction and, if necessary, stop the train entirely.

While a certain specific embodiment has been described, it is obvious that numerous changes may be made without departing from the general principle and scope of the invention.

I claim:

1. An accelerating sensing and control apparatus, adapted to be attached to a speeding body, including a circular plate valve and a bellows actuator for the valve, means comprising a bellows member and carrying a device which, upon being subjected to an excessive product of acceleration and time, causes said member to contract, said bellows actuator and the bellows member being in communication with one another and both containing a non-compressible fluid, whereby when the bellows member is caused to contract, liquid is caused to flow into the bellows actuator to elongate the same and move the plate valve from a non-operating to an operative position, a compartment in said plate valve and open at the periphery thereof, a plural of conduits A, B and C presented to the peripheral edge of the valve, said conduit B being positioned between conduits A and C and being connected to a source of pressure fluid, conduit A leading to a sump and conduit C leading to a control apparatus responsive to pressure fluid, said compartment having a peripheral length as to span conduits A and B when the valve is unresponsive to the product of acceleration and time of the speeding body and which is less than a predetermined amount, said compartment being adapted to span conduits B and C when the valve has moved in response to a product which is greater than the predetermined amount whereby a passageway is established between conduits B and C to convey pressure fluid to said control apparatus.

2. An accelerating sensing and control apparatus according to claim 1 and means positioned between said bellows actuator and the bellows member for regulating the flow of fluid therebetween whereby the rate of movement of the plate valve from the non-operative to the operative position is controlled.

3. An accelerating sensing and control apparatus according to claim 2 and in which said means includes a passageway of restricted size and an adjustable needle valve positioned at the entrance of said passageway.

4. An accelerating sensing and control apparatus according to claim 1 and in which the compartment in the circular plate valve is formed of a milled-out portion and covered by a casing which encloses the valve except for peripheral openings which coincide with the positions of the conduits A, B and C.

5. An accelerating sensing and control apparatus according to claim 1 and in which the source of pressure fluid to which conduit B is connected constitutes an electrolyte, and the control apparatus to which conduit C is connected constitutes a "dry charged" battery.

6. An accelerating sensing and control apparatus according to claim 1 and in which said device carried by the bellows which respond to an excessive product of acceleration and time is constituted of a metal weight which loosely surrounds the bellows.

7. An accelerating sensing and control apparatus according to claim 1 and in which said circular plate valve is provided with a notch at a predetermined position on its periphery, and a spring-pressed latch adapted to enter said notch when the valve has been moved to a predetermined position.

References Cited
UNITED STATES PATENTS

| | | | |
|---|---|---|---|
| 1,978,863 | 10/1934 | Gregg | 137—38 X |
| 2,278,830 | 4/1942 | Clarkson | 137—38 X |
| 2,317,028 | 4/1943 | Chappell | 73—515 X |
| 2,325,725 | 8/1943 | Wood | 137—38 |
| 2,484,165 | 10/1949 | Hathaway | 73—515 X |
| 2,595,084 | 4/1952 | Kriegel | 137—38 X |
| 2,642,885 | 6/1953 | Wade | 137—38 |
| 3,023,625 | 3/1962 | Clement | 137—56 X |
| 3,221,562 | 12/1965 | Borcher | 73—515 |
| 3,385,307 | 5/1968 | Lewis | 137—38 |

CLARENCE R. GORDON, Primary Examiner

U.S. Cl. X.R.

73—515